United States Patent [19]

Maddox

[11] 4,376,141
[45] Mar. 8, 1983

[54] PROCESS FOR COLORING MAPLE WOOD AND MAPLE VENEER

[75] Inventor: David P. Maddox, Martinsville, Va.

[73] Assignee: Stanley Interiors Corporation, Stanleytown, Va.

[21] Appl. No.: 218,360

[22] Filed: Dec. 19, 1980

[51] Int. Cl.³ .............................. B05D 3/12
[52] U.S. Cl. ........................ 427/370; 8/402; 252/1; 427/397; 427/440
[58] Field of Search ............ 427/397, 393, 440, 370; 8/402; 252/1

[56] References Cited

U.S. PATENT DOCUMENTS 933,437  9/1909  Hall ............................. 8/402
2,705,682  4/1955  Wille ....................... 427/370 X Primary Examiner—Michael R. Lusignan
Attorney, Agent, or Firm—Charles R. Rhodes; Judith G. Smith

[57] ABSTRACT

A chemical mixture containing 40% by weight of sugar in water, approximately 0.4% by weight of a shading agent such as strontium nitrate and approximately 0.06% by weight of a stabilizing agent such as potassium chromate is applied to the surface of hard rock maple or print grade maple veneer. When the surface of the wood is subjected to heat in the range of 100° F. to 900° F. and pressure in the range of 5 psi to 2000 psi the color of wood is charged substantially to approach the reddish color of cherry. The degree of color is varied by adjusting the temperature or amount of shading agent. When an embossing step is to be performed on the wood, the chemical coloring mixture is applied to the surface of the wood and the two steps (embossing and staining) are carried out simultaneously.

2 Claims, 2 Drawing Figures

PROCESS FOR COLORING MAPLE WOOD AND MAPLE VENEER

BACKGROUND AND SUMMARY OF THE INVENTION

Liquid stains are the prevalent means for coloring wood and wood veneer in the production of furniture or other wooden decorative products. In the furniture industry where much of the staining and other finishing is done by hand on an assembly line basis, problems have been created in staining difficult to reach areas or those areas comprising more than one kind of wood or the appearance of such. The pieces generally are moving through the production line too quickly to be properly stained if the process requires special attention. The obvious solution in most instances is to slow production which results in increased costs ultimately borne by the consumer.

A similar problem also existed in the specialty products area where, in addition to staining, other steps such as embossing and/or applying a different stain to selected areas of a piece were involved. Prior art methods generally included treating each step separately; i.e. dye cutting the overlay, embossing and/or staining the overlay, application to the furniture, taping the overlay, then staining and finishing the other portion of the piece. In many large suites of furniture such a multi-stage process is prohibitively expensive and the suite is generally removed from the line.

Additionally, there are frequent attempts to stain or color one wood to appear as another. This is usually done when it is economically desirable to utilize less expensive species such as hard rock maple or print grade maple veneer by staining them to give the appearance of cherry, mahogany or other more expensive varieties. On other occasions, it may simply be desired to achieve an unusual or unique color combination by staining and/or embossing some portions of the same piece of furniture differently for decorative purposes only.

For example, to produce a wood inlay appearance according to the prior art methods, it is necessary to dye cut the various types and pieces of wood and wood veneers to be inlaid. At that point, in order to achieve a cherry effect, a layer of cherry veneer would be laminated onto a cheaper variety of wood. Then the piece would be sent to the embosser for texturing. Following the embossing step the furniture piece is forwarded to the finishing line for hand staining and finishing. If a portion of the inlay is to be stained a cherry color, and a second portion another color great care involving taping over the portion not to be stained must be taken that the different stains do not overlap or bleed into the adjoining inlay. Therefore, a piece of furniture moving along an assembly line at approximately twenty feet per minute cannot be so precisely stained.

As stated above, if attempted at all, achieving all these effects usually involves an expensive and time consuming individual staining and finishing process. Not only are the known processes usually multi-stage, but the inventory of stains and finishing materials is large and represents a sizeable outlay of funds.

With the development of the present invention however, many of the above problems have been eliminated. The unique wood coloring process broadly includes the steps of applying a non-alkaline chemical coloring mixture to a piece of wood preparatory to or simultaneously with the embossing process. The heat and pressure applied during the embossing operation then causes the area under pressure to be colored while the other area remains uncolored. Thus the separate staining procedure and the necessity of using a variety of woods is eliminated. It has been found that the new process allows the very economical production of decorative, colored inlay appearance on mass produced furniture; an achievement previously considered too expensive and difficult to be utilized in mass production operations.

As will be described in greater detail hereinbelow, the new process combines the steps of staining or coloring the wood and embossing if embossing is required. Obviously if embossing is not desired the heated pressure rolls, or plates may be smooth and free of any intaglio design. The non-alkaline chemical coloring mixture is spread directly on the wood and then subjected to the heat and pressure of the embossing process. Thus, adjacent portions of wood not engaged by the heated rolls or plate may be left uncolored, or have applied thereto a different stain in a subsequent operation. The resulting effect is that of economically producing furniture pieces with the appearance of expensive wood inlays or mosaics. While the present technique has proven successful on the treatment of hard rock maple and print grade maple veneers, it is believed that the same technique could be utilized on other maples and even on other woods that have a significant sugar content.

The objects of the present invention include the economic production of furniture having the effect of expensive wood inlays, and the utilization of less expensive woods which can be treated or colored to give the appearance of more expensive varieties. A further advantage is that overall coloring of the wood may be better balanced and controlled. The chemical/sugar mixture utilizes and enhances the naturally occurring sugars in the wood so that inexpensive woods may have the effect and appearance of more expensive varieties.

Other and further advantages will become apparent to those skilled in the art as the following detailed description is studied in conjunction with the accompanying drawings of which:

FIG. 1 is a plan view illustrating the planar surface of a decorative wooden element after the coloring/embossing process of the present invention; and FIG. 2 is a front view of a piece of furniture having such decorative elements thereon.

DETAILED DESCRIPTION OF A PREFERRED EMBODIMENT

Figure 1:
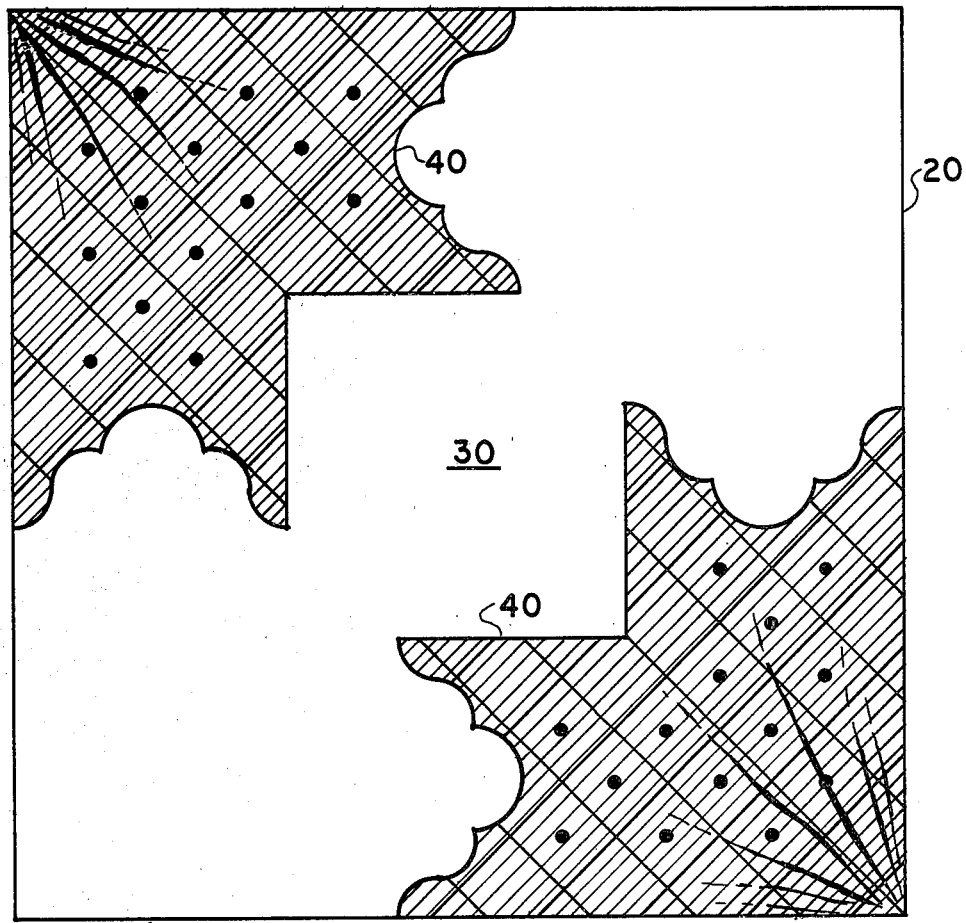
Figure 2:
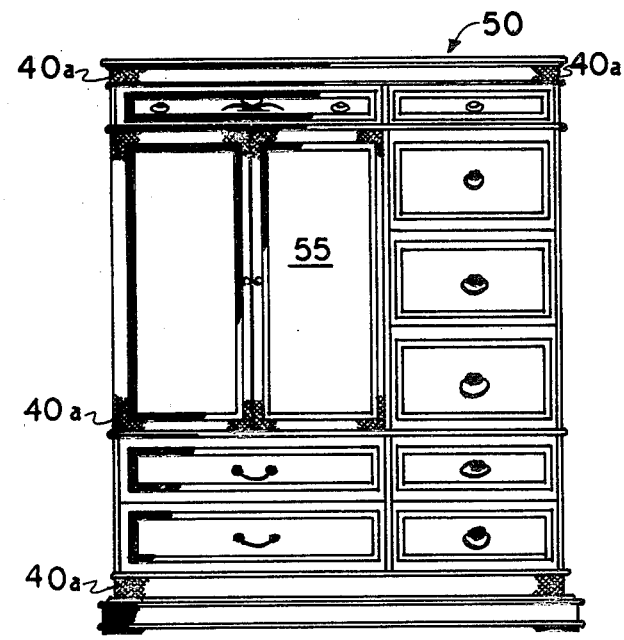

FIG. 1 is one example of the type of decorative element 10 to be used as an accent or detail piece on furniture such as shown in FIG. 2. The planar sheet 20 may be formed of a solid piece of wood having at least one finishing grade face or it may be a sheet of wood composition material with a thin layer of print grade wood veneer laminated thereon. For purposes of illustration, the wood piece 20 will be described herein as being a solid piece of hard rock maple. Prior to being colored and embossed on portions thereof the entire surface or face of the wood was smooth and unfinished as shown in the center portion 30.

Prior to the embossing operation, the chemical coloring mixture is applied over the face of the wood to be embossed. In this example, opposite corners of the sheet or block 20 were embossed. The sheet 20 is then cut or divided as necessary for application of the embossed areas 40 to the selected piece of furniture.

In FIG. 2, one can see that the embossed areas 40 have been applied as ornamental elements 40a on corner segments of the chest or armoire 50. In accordance with the present invention it is contemplated that the decorative areas 40a of an entire component for a piece of furniture, such as the chest door 55 can be embossed and/or colored in one operation. In other words, the door 55, after being cut to size, would be sent to the embosser for texturing and coloring of areas 40a rather than dyecutting separate corner detail components and applying them to the door. Subsequently the other areas can be stained or treated as desired.

The coloring process is as follows. Prior to the embossing operation, the surface of the component 55 is coated with a chemical coloring mixture as described hereinafter, which may vary slightly for the particular variety of wood being finished or the particular shade required. For example herein the sheet 20 of FIG. 1 is described as being a good grade of hard rock maple. Maple is the wood of choice for many manufacturers because it is generally a very hard wood, is very workable, and is of a relatively pale, easily stained natural color. Maple is known to have a relatively high sugar content, and the areas of grain in the wood represent areas of highly concentrated reddish pigments. It was recognized that sugar will change color with application of various levels of heat and pressure and thus experiments were conducted with sugar/water solutions applied to maple as a wood coloring or staining agent. The present process was perfected and with this technique the industry can now supply furniture with consistant appearance of wood inlays.

Following application of the staining or coloring mixture to the component or to selected areas of the component 55 the wood sheets are then embossed. As the embossing operation is performed, the coloring mixture becomes impregnated in and reacts with the sugar in the wood to effect a significant color change thereto. With hard rock maple or print grade maple veneer application of the mixture described below will turn the wood from an almost white color to a warm, reddish brown tint strongly resembling cherry.

The chemical coloring agent used to color hard rock maple is:

Water ($H_2O$);
Sugar ($C_{12}H_{22}O_{11}$)—40% by solution weight of $H_2O$;
Strontium Nitrate ($Sr(NO_3)_2$)—0.4% by solution weight of $H_2O$;
Potassium Chromate ($K_2CrO_4$)—0.06% by solution weight of $H_2O$.

By applying the above formulation to the wood or veneer, then subjecting the veneer to pressures varying from 5 psi to 2000 psi and temperatures from 100° F. to 900° F., for time periods of 0.2 seconds to 60 seconds, various shades of red are impregnated in the grain structure of the wood. By adjusting the temperature, color impregnation varies from a light pink to a cherry red. It is also shown that the above process does not hinder or degredate nitrocellulose finishes and is compatible with conventional finishing techniques.

The particular amounts of each ingredient in the chemical composition of the above formula depends on the sugar/water for coloring of the maple and the shade desired. During the experimental stage, heat was applied to maple, absent the above formula. There was no uniform discoloration to the wood because of the inconsistency of sugar distribution in the wood itself. The purpose of the sugar in the present formula is to assure even distribution and penetration over the surface of the maple.

The potassium chromate was added to the formula for stability; and the strontium nitrate effects subtle color shadings by increasing the warm red tones. Although other strontium based compounds such as strontium chlorate and strontium sulfite would also be effective, care must be taken to avoid the formation of toxic compositions which can occur when strontium is subjected to tremendous heat and pressure. Strontium nitrate is generally preferred because it does not form a new toxic composition under the described process of heat and pressure. Similar problems can occur with substitution of other potassium compounds as stabilizers. Here again while other potassium compounds may be used, potassium chromate when used in this described process is known to be non-toxic.

Again the above formula may be applied to maple under heat and pressure absent the embossing or texturizing operation if only coloring is desired.

Other and further modifications may be made to the process while remaining within the scope of the claims below.

What is claimed is:
1. A process for coloring the surface of hardrock maple and print grade maple veneer to resemble cherry, said process comprising the steps of:
  (a) coating the surface of said wood with a sugar and water composition comprising:
    (i) water ($H_2O$);
    (ii) sugar ($C_{12}H_{22}O_{11}$)—40% by solution weight of $H_2O$;
    (iii) strontium nitrate ($Sr(NO_3)_2$)—0.4% by solution weight of $H_2O$;
    (iv) potassium chromate ($K_2CrO_4$)—0.06% by solution weight of $H_2O$; and
  (b) subjecting the coated wood to simultaneous application of heat and pressure for a predetermined period of time.

2. A chemical composition for use in coloring wood when said wood is subsequently subjected to heat and pressure, said composition comprising:
  (a) Water ($H_2O$);
  (b) Sugar ($C_{12}H_{22}O_{11}$)—40% by solution weight of $H_2O$;
  (c) Strontium Nitrate ($Sr(NO_3)_2$)—0.4% by solution weight of $H_2O$;
  (d) Potassium Chromate ($K_2CrO_4$)—0.06% by solution weight of $H_2O$.

* * * * *